(12) United States Patent
Hwang

(10) Patent No.: US 11,242,858 B2
(45) Date of Patent: Feb. 8, 2022

(54) ROTARY DEVICE

(71) Applicant: HANWHA POWERSYSTEMS CO., LTD., Changwon-si (KR)

(72) Inventor: Jin Seok Hwang, Changwon-si (KR)

(73) Assignee: HANWHA POWERSYSTEMS CO., LTD, Changwon-si (KR)

( * ) Notice: Subject to any disclaimer, the term of this patent is extended or adjusted under 35 U.S.C. 154(b) by 140 days.

(21) Appl. No.: 16/838,244

(22) Filed: Apr. 2, 2020

(65) Prior Publication Data

US 2020/0332802 A1 Oct. 22, 2020

(30) Foreign Application Priority Data

Apr. 18, 2019 (KR) .................. 10-2019-0045245

(51) Int. Cl.
| | |
|---|---|
| *F04D 25/08* | (2006.01) |
| *F04D 25/06* | (2006.01) |
| *F04D 29/10* | (2006.01) |
| *F04D 17/10* | (2006.01) |
| *F04D 29/08* | (2006.01) |
| *F16J 15/447* | (2006.01) |

(52) U.S. Cl.
CPC ........... *F04D 25/082* (2013.01); *F04D 17/10* (2013.01); *F04D 25/0606* (2013.01); *F04D 29/083* (2013.01); *F04D 29/102* (2013.01); *F05B 2240/57* (2013.01); *F05B 2260/20* (2013.01); *F16J 15/4476* (2013.01)

(58) Field of Classification Search
CPC .. F04D 25/0606; F04D 25/082; F04D 29/102; F04D 29/441; F04D 29/083; F04D 17/10; F16J 15/4476; H02K 1/32; F05D 2240/55
See application file for complete search history.

(56) References Cited

U.S. PATENT DOCUMENTS

| | | | | |
|---|---|---|---|---|
| 8,444,379 B2 * | 5/2013 | Nakaniwa | ............. | F04D 29/669 415/208.1 |
| 10,428,840 B2 * | 10/2019 | Ohta | ........................ | F04D 17/16 |
| 2016/0032931 A1 * | 2/2016 | Lee | ........................ | F04D 25/082 417/368 |
| 2018/0248428 A1 | 8/2018 | Nigo et al. | | |
| 2020/0259193 A1 * | 8/2020 | Sakota | .................. | F04D 29/584 |

FOREIGN PATENT DOCUMENTS

| | | |
|---|---|---|
| JP | 2011-202641 A | 10/2011 |
| KR | 10-1408000 B1 | 6/2014 |

* cited by examiner

*Primary Examiner* — Ninh H. Nguyen
(74) *Attorney, Agent, or Firm* — Sughrue Mion, PLLC

(57) ABSTRACT

A rotary device includes: a housing; an impeller disposed in the housing; a rotor disposed in the housing and configured to drive the impeller; and a labyrinth seal disposed between the impeller and the rotor in the housing and configured to control an amount of air injected through the impeller to cool the rotor. A flow path opening that penetrates through the rotor is formed inside the rotor along a rotational axis of the rotor and the labyrinth seal comprises a teeth portion having a predetermined number of steps provided in the labyrinth seal.

16 Claims, 7 Drawing Sheets

ROTARY DEVICE

CROSS-REFERENCE TO THE RELATED APPLICATION

This non-provisional application claims priority from Korean Patent Application No. 10-2019-0045245 filed on Apr. 18, 2019 in the Korean Intellectual Property Office, the disclosure of which is incorporated herein by reference in its entirety.

BACKGROUND

1. Field

Apparatuses consistent with exemplary embodiments relate to a rotary device, and more particularly, to a rotary device capable of cooling internal structures thereof during the driving of a rotor equipped with, for example, a permanent magnet.

2. Description of the Related Art

A rotary device is provided to meet the demand for the development of a high-performance, high-output electric device. Examples of the rotary device include an industrial compressor having a rotor-bearing structure, a pump, or a vehicular air supply device as well as a generator, an electric motor, or the like.

In order to drive the rotary device, a rotating body having a permanent magnet embedded therein may be provided to be rotatable by a motor. Also, the rotary device may include cooling flow paths for cooling, for example, the friction heat generated in the motor and elements associated with the rotation of the motor, such as, for example, air foil bearings, bearing disks, or the like.

Specifically, first and second cooling flow paths may be formed in the rotary device to release heat generated by the motor or air foil bearings. The air at the rear of an impeller of the rotary device may be joined by the air supplied from the exterior of the rotary device through multiple labyrinth seals. In the rotary device, i) an air foil bearing (e.g., a thrust air foil bearing), which is positioned perpendicularly to the rotational axis of the rotary device, at the front of a rotor, ii) another air foil bearing (e.g., a radial air foil bearing) which is positioned along the rotational axis of the rotary device, and iii) the rotor may be cooled by the first cooling flow path. The first cooling flow path may be joined by the second cooling flow path after cooling the air foil bearings and the rotor. The rear of the air foil bearing positioned along the rotational shaft may be cooled by the second cooling flow path, and the second cooling flow path may be joined with the first cooling flow path to cool the motor and may then form a flow path to exit of the rotary device.

The first and second cooling flow paths, however, perform cooling by drawing in the external air and thus need additional equipment such as equipment for ingesting air. The provision of additional equipment may result in an increase in the size or the weight of the rotary device, adversely affecting the its size and weight of the rotary device. Also, because the air used in cooling needs to be discharged out of the rotary device, the efficiency of the rotary device may decrease due to flow loss.

Therefore, a rotary device not only capable of preventing unnecessary flow loss through the efficient circulation of air along cooling flow paths while contributing to compactness and light weight of the rotary device is needed.

SUMMARY

Exemplary embodiments of the present disclosure provide a rotary device capable of cooling high-temperature friction heat generated in elements thereof (e.g., bearings, a rotor, a motor, and the like) only using the internal air therein.

However, exemplary embodiments of the present disclosure are not restricted to those set forth herein. The above and other exemplary embodiments of the present disclosure will become more apparent to one of ordinary skill in the art to which the present disclosure pertains by referencing the detailed description of the present disclosure given below.

According to an aspect of an exemplary embodiment, there is provided a rotary device including: a housing; an impeller disposed in the housing; a rotor disposed in the housing and configured to drive the impeller; and a labyrinth seal disposed between the impeller and the rotor in the housing and configured to control an amount of air injected through the impeller to cool the rotor. A flow path opening that penetrates through the rotor is formed inside the rotor along a rotational axis of the rotor and the labyrinth seal includes a teeth portion having a predetermined number of steps provided in the labyrinth seal.

The rotary device further includes: first bearings supporting the rotor; a second bearing supporting the rotor; a diffuser fixedly coupled to the housing and supporting the rotor; and a motor configured to generate rotational power to drive the rotor. And, the housing comprises: a first cooling flow path; and a second cooling flow path. The first cooling flow path is formed so that the air injected through the impeller is ejected through the labyrinth seal, the second bearing, the first bearings, and the rotor. The second cooling flow path is formed so that the air injected through the impeller is ejected through the diffuser, the motor, and the rotor.

The first cooling flow path may be formed so that the air injected through the impeller is compressed in the labyrinth seal and then ejected through the second bearing, and the first bearings.

The second cooling flow path may be formed so that the air injected through the impeller passes through the diffuser and is ejected through the motor.

The rotor may include: a fastening rod which forms the framework of the rotor; permanent magnets disposed on the fastening rod and are assembled to the inside of the housing; and a sleeve member which surrounds the permanent magnets.

The impeller may be coupled to the rotor by the fastening rod.

The teeth portion of the labyrinth seal may be formed to be inclined with respect to a direction from the rotor toward the impeller.

The teeth portion of the labyrinth seal may have a single step.

A gap may be formed between the labyrinth seal and the rotor.

Air moving along the first and second cooling flow paths is joined at the flow path opening of the rotor.

The air joined at the flow path opening of the rotor may be supplied into the impeller.

The air supplied to the impeller may be recirculated through the first and second cooling paths.

According to an aspect of another exemplary embodiment, there is provided a rotary device including: a housing; an impeller disposed in the housing; a rotor disposed in the housing and configured to drive the impeller; first bearings supporting the rotor; a second bearing supporting the rotor; a motor configured to generate rotational power to drive the rotor; and a diffuser fixedly coupled to the housing and supporting the rotor and including a labyrinth seal disposed between the impeller and the rotor in the housing and configured to control an amount of air injected through the impeller to cool the rotor, the first bearings, the second bearing and the motor. The housing may include: a first cooling flow path; and a second cooling flow path. A first portion of the air injected through the impeller passes through the labyrinth seal, the second bearing, the first bearings, and the rotor via the first cooling flow path, and a second portion of the air injected through the impeller passes through the diffuser, the motor, and the rotor via the second cooling flow path.

The rotor may include a flow path opening penetrating through the rotor, and the first portion and the second portion of the air are joined at the flow path opening of the rotor.

The first portion and the second portion of the air joined at the flow path opening of the rotor may be re-supplied into the impeller.

The first portion and the second portion of the air re-supplied to the impeller may be recirculated through the first and second cooling paths.

According to the aforementioned and other exemplary embodiments, the elements of the rotary device (e.g., bearings, a rotor, a motor, and the like) can be cooled only using the internal air in the rotary device.

Accordingly, because no particular additional element for bringing in external air is needed, the internal structure of the rotary device can be simplified, and the size and the weight of the rotary device can be reduced.

In addition, because the rotary device includes a structure in which the internal air circulates along two cooling flow paths, flow loss can be prevented, and as a result, the efficiency of the rotary device can be improved.

Other features and exemplary embodiments may be apparent from the following detailed description, the drawings, and the claims.

BRIEF DESCRIPTION OF THE DRAWINGS

The above and/or other features of the disclosure will become more apparent by describing in detail exemplary embodiments thereof with reference to the attached drawings, in which.

DETAILED DESCRIPTION

Figure 1:
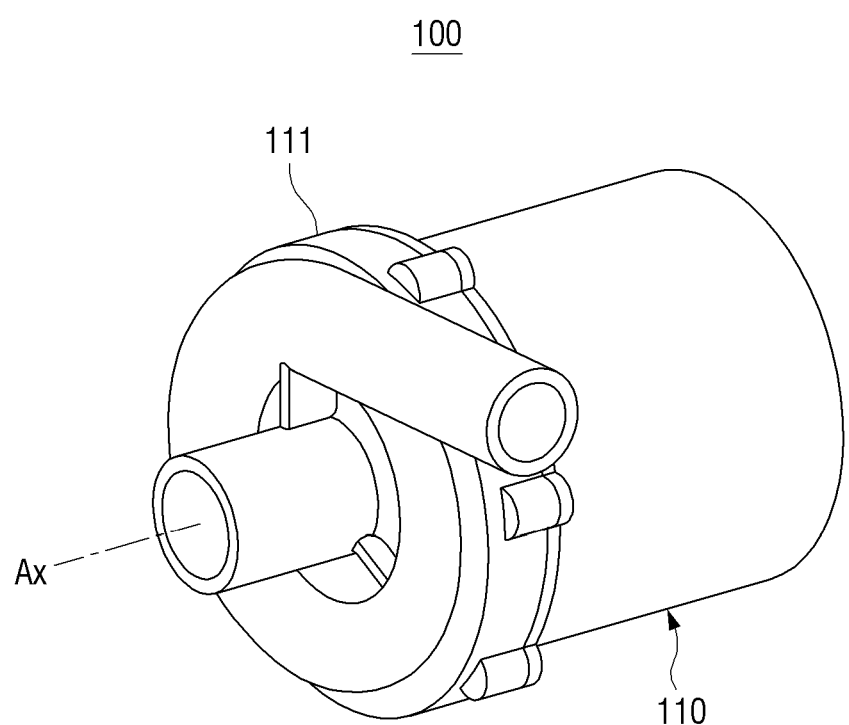
FIG. 1 is a perspective view of a rotary device according to an exemplary embodiment.

Advantages and features of the present disclosure and methods of accomplishing the same may be understood more readily by reference to the following detailed description of exemplary embodiments and the accompanying drawings. The present disclosure may, however, be embodied in many different forms and should not be construed as being limited to the embodiments set forth herein. Rather, these exemplary embodiments are provided so that this disclosure will be thorough and complete and will fully convey the concept of the present disclosure to those skilled in the art, and the present disclosure will only be defined within the scope of the appended claims. In the drawings, like reference numerals indicate like elements.

Unless otherwise defined, all terms (including technical and scientific terms) used herein have the same meaning as commonly understood by one of ordinary skill in the art to which the exemplary embodiments belong. It will be further understood that terms, such as those defined in commonly used dictionaries, should be interpreted as having a meaning that is consistent with their meaning in the context of the relevant art and this specification and will not be interpreted in an idealized or overly formal sense unless expressly so defined herein.

In the following description of the present disclosure, the terms used are for explaining exemplary embodiments of the present disclosure, but do not limit the scope of the present disclosure. In the description, a singular expression may include a plural expression unless specially described. The term "comprises" and/or "comprising" used in the description means that one or more other components, steps, operation and/or existence or addition of elements are not excluded in addition to the described components, steps, operation and/or elements. Further, the term "and/or" includes each of mentioned items and all combinations of one or more of the items.

Exemplary embodiments of the present disclosure will hereinafter be described with reference to the accompanying drawings.

Figure 2:
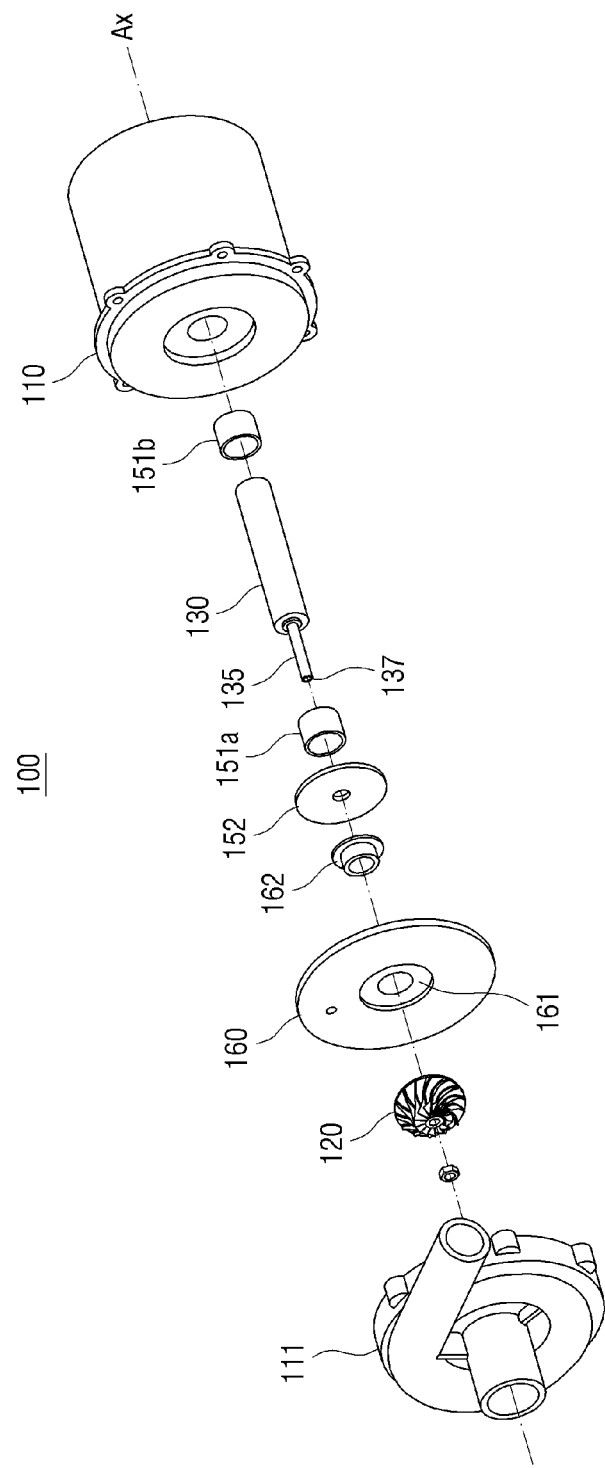
FIG. 2 is an exploded perspective view of a rotary device of FIG. 1 according to an exemplary embodiment.
Figure 3:
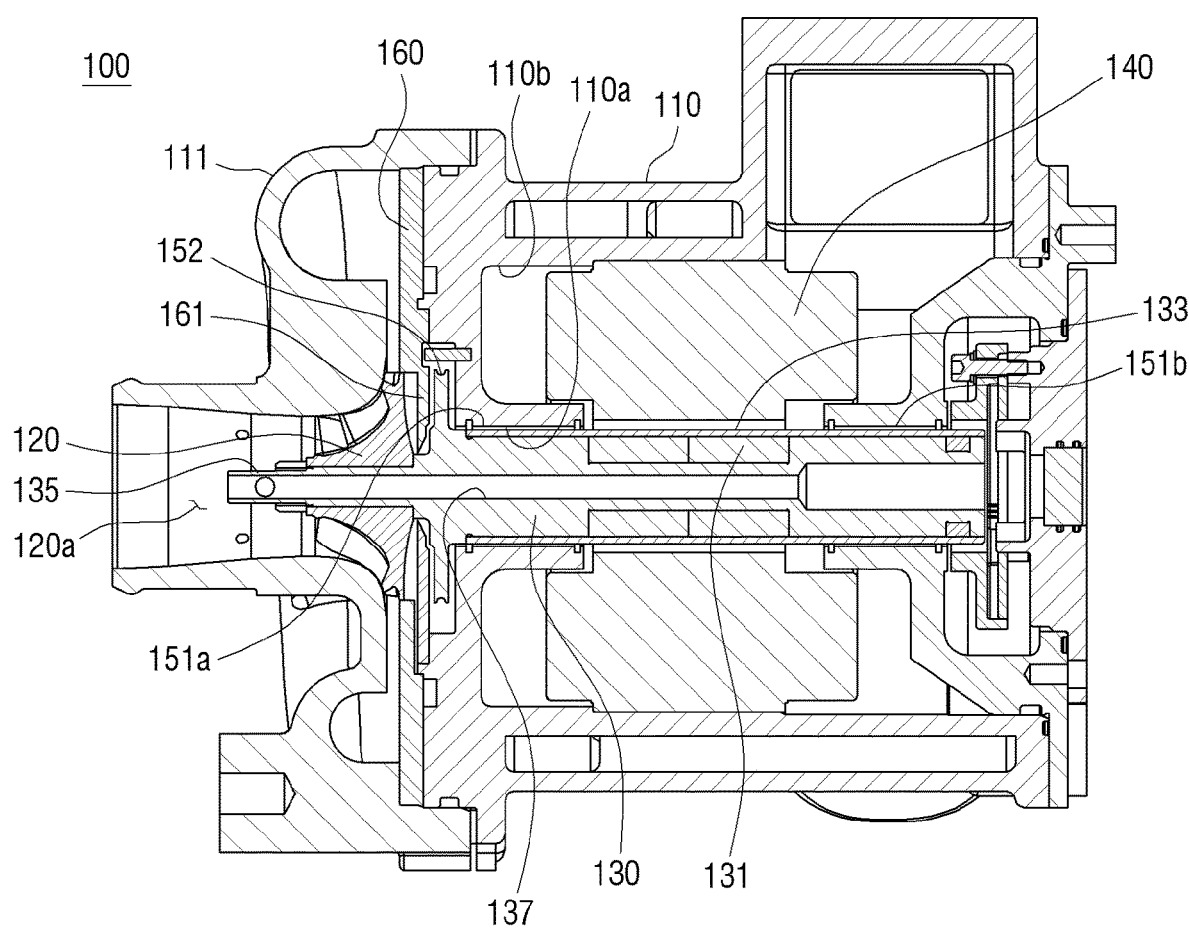
FIG. 3 is a cross-sectional view of a rotary device of FIG. 1 according to an exemplary embodiment.

FIG. 1 is a perspective view of a rotary device 100 according to an exemplary embodiment. FIG. 2 is an exploded perspective view of a rotary device 100 according to an exemplary embodiment. FIG. 3 is a cross-sectional view of a rotary device 100 according to an exemplary embodiment.

Referring to FIGS. 1 through 3, the rotary device 100 may include a housing 110, an impeller 120, a rotor 130, a motor 140, a bearing member 150 (e.g., first bearings 151a and 151b and a second bearing 152), a diffuser 160, a labyrinth seal 161, and a spiral case 111.

The housing 110 may form first and second spaces 110a and 110b which receive the rotor 130 and the motor 140, respectively. The first space 110a may be formed to penetrate through the housing 110 to include a rotational axis Ax, and the rotor 130 may be rotatably received in the first space 110a. The second space 110b may be located around the periphery of the first space 110a, and the motor 140 may be received in the second space 110b. A cooling fluid receiving space in which a cooling fluid capable of cooling heat generated in the motor 140 may be further provided adjacent to the first and second spaces 110a and 110b. The spiral case 111 (also referred to as a scroll) may be fastened to one end of the housing 110. The spiral case 111 may be fastened to one surface of the housing 110 and may provide the moving path of a gas. Although not specifically illustrated, the spiral case 111 may include an inlet for injecting a gas, an outlet for ejecting the gas, and a transfer tube which provides the moving path of a gas between the inlet and the outlet. The housing 110 may be formed to be symmetrical with respect to the rotational axis Ax.

The impeller 120 may be provided in the housing 110, at the front portion of the housing 110, to be rotatable at high speed for compressing a gas. For example, the impeller 120 may receive a rotational force from the rotor 130 and may thus pressure the gas while rotating. The impeller 120 may be fastened to a fastening rod 135 to be connected to the rotor 130 and to receive the rotational force of the rotor 130. For example. the impeller 120 may be rotatably fastened to the fastening rod 135 by a fastening member.

The rotor 130 may be mounted in the first space 110*a*, along the rotational axis Ax, to be rotatable about the rotational axis Ax. The rotor 130 may include the fastening rod 135, which forms the framework of the rotor 130, permanent magnets 133 which are disposed on the fastening rod 135 and are assembled to the inside of the housing 110, and a sleeve member 131 which surrounds the permanent magnets 133. The fastening rod 135 may be formed on the rotational axis Ax. The rotor 130 may be fastened to the impeller 120 by the fastening rod 135, which is formed on the rotational axis Ax, and may transmit rotational power generated by the motor 140 to the impeller 120. The permanent magnets 133 generate a predetermined rotational force from electrical energy input via an electromagnetic interaction with the motor 140, which is provided in the housing 110. Each of the permanent magnets 133 may be formed by combining at least two separate permanent magnet parts, but the exemplary embodiment is not limited thereto. That is, various modifications can be made to the structure of the permanent magnets 133. For example, each of the permanent magnets 133 may be formed as a single integral element. Multiple permanent magnets 133 may be arranged at substantially constant intervals along the outer circumference of the fastening rod 135.

The sleeve member 131 may be provided to surround the outer circumferences of the permanent magnets 133. The sleeve member 131 restrains the permanent magnets 133 from being separated from the fastening rod 135 by a centrifugal force generated by high-speed rotation.

The fastening rod 135 couples the rotor 135 and the impeller 120 together. The second bearing 152 may be rotatably coupled to the fastening rod 135. Screw threads may be formed at the end of the fastening rod 135, and a coupling member such as a nut may be coupled to the screw threads of the coupling rod 135 to couple the impeller 135 to the fastening rod 135. The coupling member may be coupled to the end of the fastening rod 135 through the screw threads.

As the motor 140 generates a varying magnetic force in accordance with a driving current input thereto, the rotor 130 may rotate due to the permanent magnets 133. The rotor 130 may rotate at a speed of about 30,000 rpm or higher due to the permanent magnets 133 and the motor 140. The rotation of the rotor 130 may be supported by a front-side radial bearing 151*a* and a rear-side radial bearing 151*b*, which are installed at both ends of the housing 110 where the rotor 130 is received, and the second bearing 152, which is installed near one end of the housing 110.

Although not specifically illustrated, the motor 140 may include a winding portion and a core portion. A driving current may be input to the motor 140 as a driving signal to the motor 140, and the motor 140 may electromagnetically interact with the rotor 130, particularly, with the permanent magnets 133. Accordingly, the coupling rod 135 may rotate, and the impeller 120, which is coaxially connected to the coupling rod 135, can be driven at a predetermined rotation speed in accordance with an input current.

The bearing member 150 may reduce the friction between the rotor 130 and the housing 110 and may support the rotor 130 when the rotor 130 rotates. The bearing member 150 may include the first bearings 151 and the second bearing 152.

The first bearings 151, which are radial bearings, may include air foil bearings. The first bearing 151 may be provided to support the radial load of the rotor 130 while maintaining a predetermined bearing gap with the rotor 130. The first bearing 151 may be installed at the front and the rear of the first space 110*a*, which receives the rotor 130. For example, the front-side radial bearing 151*a* may be provided at the front of the first space 110*a*, and the rear-side radial bearing 151*b* may be provided at the rear of the first space 110*a*.

The second bearing 152, which is a thrust bearing, may include an air foil bearing. The second bearing 152 may be installed perpendicularly to the rotational axis of the rotor 130. The second bearing 152 may absorb the rotational load of the impeller 120. The second bearing 152 may preferably be formed to have a sufficient area to receive fluid pressure that can counteract the rotational load of the impeller 120.

The first bearings 151 and the second bearing 152 may include air foil bearings, but the exemplary embodiment is not limited thereto. Various modifications can be made to the structure of the first bearings 151 as long as the first bearings 151 can have appropriate specifications to suppress vibration of the rotor 130 and can properly support the rotational load of the rotor 130.

The diffuser 160 is fixedly coupled to the housing 110 not only to form a flow path for expanding the air at the rear of the impeller 120, but also to support one end of the rotor 130. That is, the rotor 130 may be supported by the diffuser 160 to be rotatable with respect to the housing 110. A sealing member may be further provided at the center of the diffuser 160 where the rotor 130 is coupled. The sealing member may restrict the flow of a gas pressurized by the impeller 120 between the rotor 130 and the impeller 120 to prevent the gas from entering the housing 110. The sealing member may include the labyrinth seal 161 and a shielding ring 162. The labyrinth seal 161 may be attached to one surface of the diffuser 160, and the rotor 130 may be supported by the diffuser 160 through the labyrinth seal 161.

Figure 4:
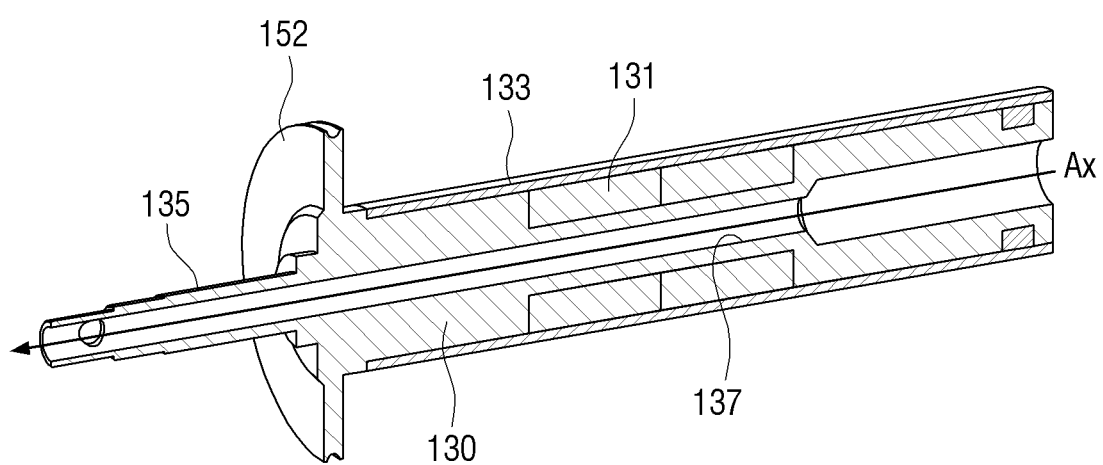
FIG. 4 is a partial cross-sectional perspective view of a rotor of a rotary device of FIG. 1 according to an exemplary embodiment.
Figure 5:
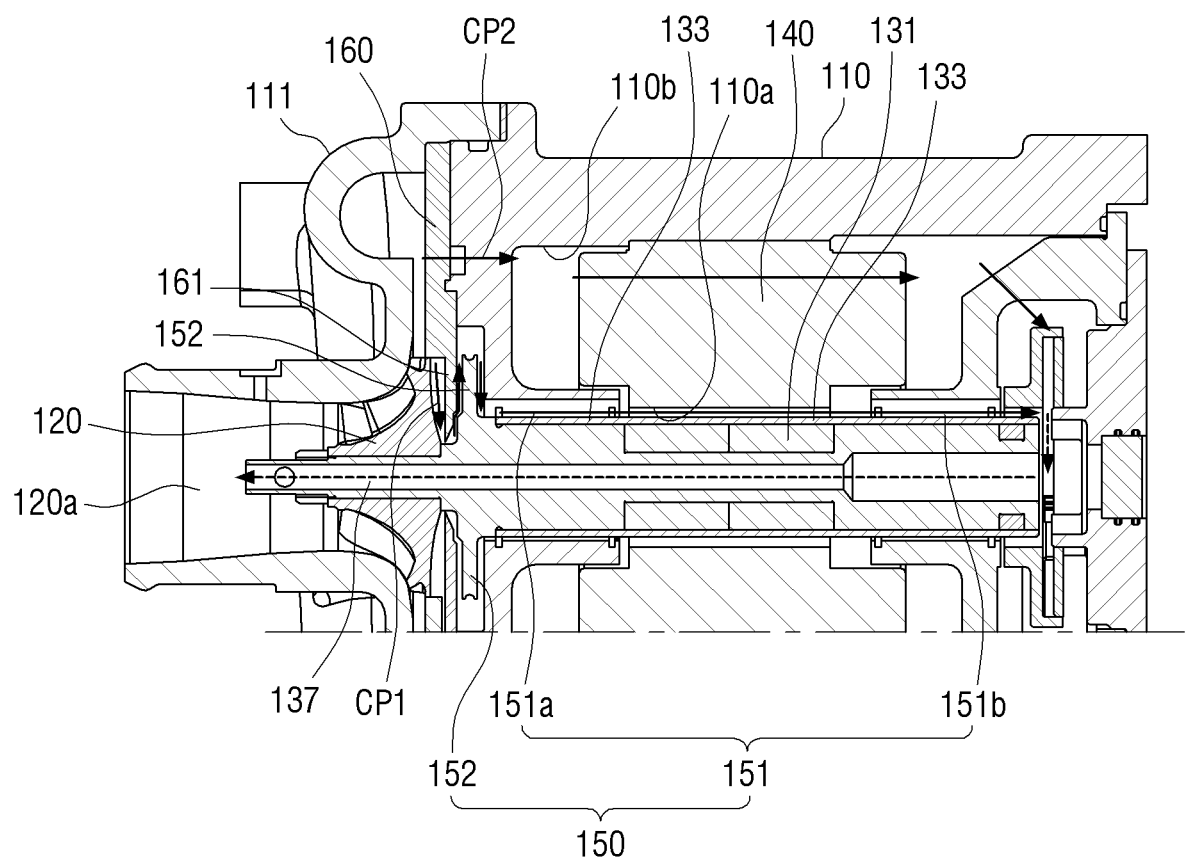
FIG. 5 is a cross-sectional view illustrating the cooling flow path of a rotary device of FIG. 1 according to an exemplary embodiment.
Figure 6:
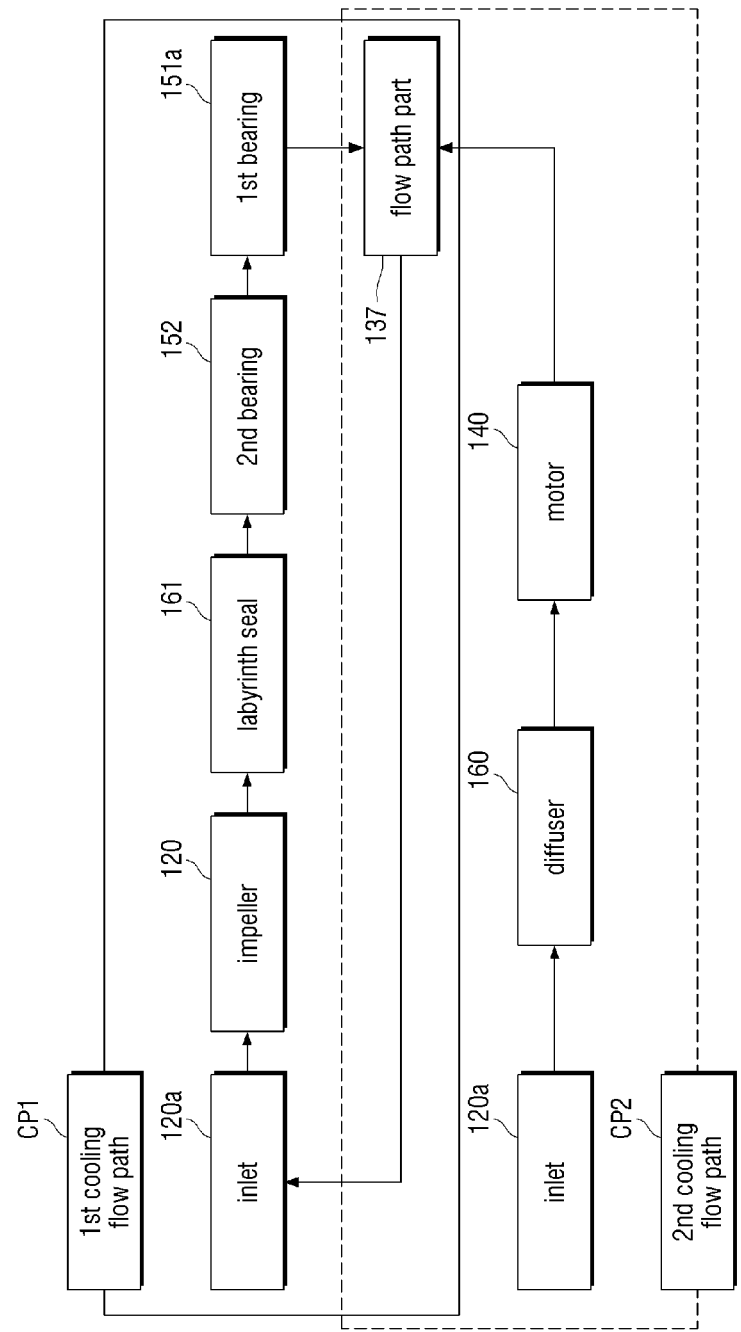
FIG. 6 is a block diagram illustrating the cooling flow path of a rotary device of FIG. 1 according to an exemplary embodiment.

FIG. 4 is a partial cross-sectional perspective view of the rotor 130 of a rotary device 100 according to an exemplary embodiment. FIG. 5 is a cross-sectional view illustrating a cooling flow path of a rotary device 100 according to an exemplary embodiment. FIG. 6 is a block diagram illustrating a cooling flow path of a rotary device 100 according to an exemplary embodiment.

Referring to FIGS. 4 through 6, a flow path part 137 (or a flow path opening 137) which is for circulating the cooling gas may be formed in the rotor 130.

The flow path part 137 may be formed to penetrate through the center of the rotor 130 along the rotational axis Ax. The flow path part 137 may form a flow path for supplying the air to an inlet 120*a* of the impeller 120.

At least two cooling flow paths, i.e., first and second cooling flow paths CP1 and CP2, may be formed in the rotary device 100.

The first cooling flow path CP1 may be formed so that the air passing through the impeller 120 is ejected through the labyrinth seal 161, the first bearings 151, and the rotor 130.

Specifically, the first cooling path CP1 may be formed at the rear of the impeller 120 so that the cooling air from the inlet 120a of the impeller 120 flows through the space between the labyrinth seal 161 and the rotor 130, through the second bearing 152, through the spaces between the first bearings 151 and the motor 140, and back to the flow path part 137 of the rotor 130. Accordingly, a portion of the air ejected toward the inlet 120a of the impeller 120 from the flow path part 137 of the rotor 130 can be recirculated and can thus be recovered. That is, the cooling air moving along the first cooling flow path CP1 may flow between the second bearing 152, the first bearings 151, and the motor 140 to cool the heat generated in the second bearing 152, the first bearings 151, and the motor 140. The air injected into the flow path part 137 along the first cooling flow path CP1 and the air moving along the second cooling flow path CP2 may be joined at the flow path part 137.

The second cooling flow path CP2 is formed so that the air passing through the impeller 120 from the flow path part 137 of the rotor 130 is ejected through the diffuser 160, the motor 140, and the rotor 130.

Specifically, the second cooling flow path CP2 may be formed so that the air flows from the inlet 120a of the impeller 120 through a hole formed in the diffuser 160, through the inside of the motor 140, and back to the flow path part 137 of the rotor 130. Accordingly, a portion of the air ejected toward the inlet 120a of the impeller 120 may be recirculated and can thus be recovered. The air moving along the second cooling flow path CP2 and the air moving along the first cooling flow path CP1 may be joined at the flow path part 137.

Figure 7:
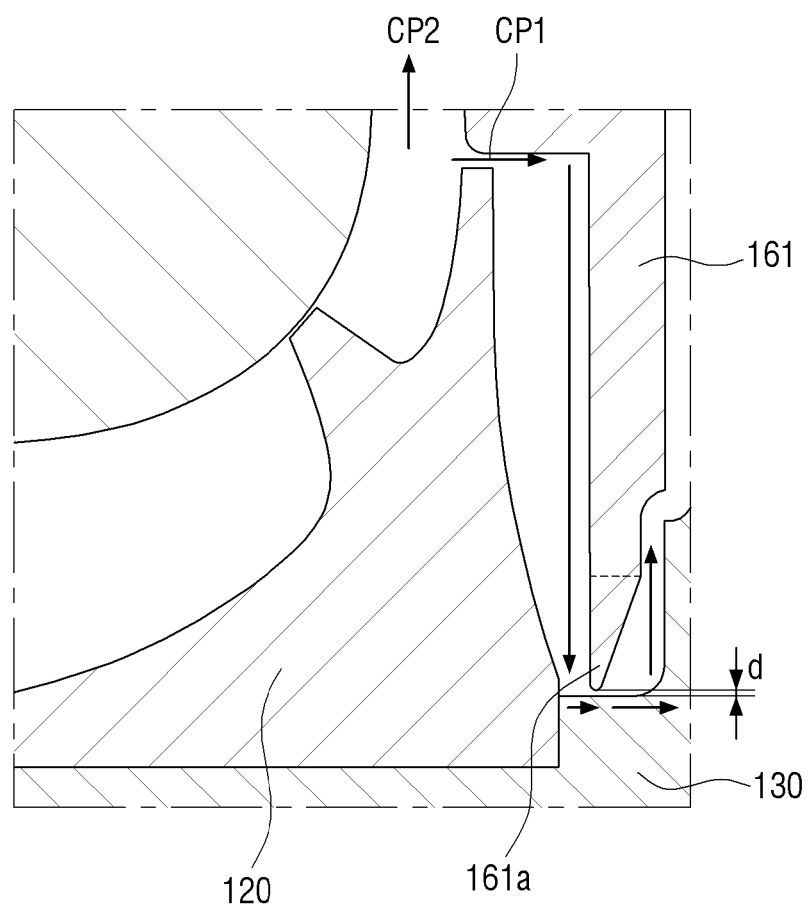
FIG. 7 is a cross-sectional view illustrating the path of a cooling fluid injected through the rear of an impeller of the rotary device of FIG. 1 according to an exemplary embodiment.

FIG. 7 is a cross-sectional view illustrating a path of a cooling fluid injected through the rear of the impeller 120 of the rotary device 100.

Referring to FIG. 7, the rotary device 100 may include two cooling flow paths for heat dissipation, i.e., the first and second cooling flow paths CP1 and CP2. As already mentioned above, the rotary device 100 may have a structure in which the air flowing along the first cooling flow path CP1 is recovered and recirculated through the first and second cooling flow paths CP1 and CP2 and the air is supplied through the second cooling flow path CP2.

Accordingly, in order to increase the amount of flow of the air injected only through the second cooling flow path CP2, a teeth portion 161a having a single step may be applied to the labyrinth seal 161, and a gap d may be formed between the labyrinth seal 161 and the rotor 130. Generally, a teeth portion having multiple steps are formed in a labyrinth seal to repeatedly perform adiabatic expansion and adiabatic compression, and the labyrinth seal controls the amount of leakage of the air by limiting the volume of such expansion. However, because the teeth portion 161a of the labyrinth seal 161 has a single step and the gap d is formed between the labyrinth seal 161 and the rotor 130, the cooling effect is enhanced by adiabatic expansion, and only internal air can be used as the cooling fluid without the need to use external air. The teeth portion 161a of the labyrinth seal 161 may be formed to be inclined in a direction from the rotor 130 toward the impeller 120, as illustrated in FIG. 7.

While exemplary embodiments have been described above, it will be understood by those of ordinary skill in the art that various changes in form and details may be made therein without departing from the spirit and scope of the disclosure as defined by the following claims.

What is claimed is:

1. A rotary device comprising:
   a housing;
   an impeller disposed in the housing;
   a rotor disposed in the housing and configured to drive the impeller; and
   a labyrinth seal disposed between the impeller and the rotor in the housing and configured to control an amount of air injected through the impeller to cool the rotor,
   wherein a flow path opening that penetrates through the rotor is formed inside the rotor along a rotational axis of the rotor, and
   wherein the labyrinth seal comprises a teeth portion having a predetermined number of steps provided in the labyrinth seal.

2. The rotary device of claim 1, wherein the rotary device further comprises:
   first bearings supporting the rotor;
   a second bearing supporting the rotor;
   a diffuser fixedly coupled to the housing and supporting the rotor; and
   a motor configured to generate rotational power to drive the rotor, and
   wherein the housing comprises a first cooling flow path and a second cooling flow path,
   wherein the first cooling flow path is formed so that the air injected through the impeller is ejected through the labyrinth seal, the second bearing, the first bearings, and the rotor, and
   wherein the second cooling flow path is formed so that the air injected through the impeller is ejected through the diffuser, the motor, and the rotor.

3. The rotary device of claim 2, wherein the first cooling flow path is formed so that the air injected through the impeller is compressed in the labyrinth seal and then ejected through the second bearing, and the first bearings.

4. The rotary device of claim 2, wherein the second cooling flow path is formed so that the air injected through the impeller passes through the diffuser and is ejected through the motor.

5. The rotary device of claim 1, wherein the rotor comprises:
   a fastening rod which forms a framework of the rotor;
   permanent magnets disposed on the fastening rod and are assembled to the inside of the housing; and
   a sleeve member which surrounds the permanent magnets.

6. The rotary device of claim 5, wherein the impeller is coupled to the rotor by the fastening rod.

7. The rotary device of claim 1, wherein the teeth portion of the labyrinth seal is formed to be inclined with respect to a direction from the rotor toward the impeller.

8. The rotary device of claim 7, wherein the teeth portion of the labyrinth seal has a single step.

9. The rotary device of claim 1, wherein a gap is formed between the labyrinth seal and the rotor.

10. The rotary device of claim 2, wherein air moving along the first and second cooling flow paths is joined at the flow path opening of the rotor.

11. The rotary device of claim 10, wherein the air joined at the flow path opening of the rotor is supplied into the impeller.

12. The rotary device of claim 11, wherein the air supplied to the impeller is recirculated through the first and second cooling paths.

13. A rotary device comprising:
a housing;
an impeller disposed in the housing;
a rotor disposed in the housing and configured to drive the impeller;
first bearings supporting the rotor;
a second bearing supporting the rotor;
a motor configured to generate rotational power to drive the rotor; and
a diffuser fixedly coupled to the housing and supporting the rotor and comprising a labyrinth seal disposed between the impeller and the rotor in the housing, and configured to control an amount of air injected through the impeller to cool the rotor, the first bearings, the second bearing and the motor,
wherein the housing comprises a first cooling flow path, and a second cooling flow path,
wherein a first portion of the air injected through the impeller passes through the labyrinth seal, the second bearing, the first bearings, and the rotor via the first cooling flow path, and
wherein a second portion of the air injected through the impeller passes through the diffuser, the motor, and the rotor via the second cooling flow path.

14. The rotary device of claim 13, wherein the rotor comprises a flow path opening penetrating through the rotor, and
wherein the first portion and the second portion of the air are joined at the flow path opening of the rotor.

15. The rotary device of claim 14, wherein the first portion and the second portion of the air joined at the flow path opening of the rotor are re-supplied into the impeller.

16. The rotary device of claim 15, wherein the first portion and the second portion of the air re-supplied to the impeller are recirculated through the first and second cooling paths.

* * * * *